United States Patent [19]

Keller et al.

[11] 4,304,896

[45] Dec. 8, 1981

[54] POLYPHTHALOCYANINE RESINS

[75] Inventors: Teddy M. Keller, Alexandria, Va.; James R. Griffith, Riverdale Heights, Md.

[73] Assignee: The United States of America as represented by the Secretary of the Navy, Washington, D.C.

[21] Appl. No.: 179,607

[22] Filed: Aug. 19, 1980

[51] Int. Cl.$^3$ .................. C08G 73/06; C07C 121/75
[52] U.S. Cl. ................................ 528/9; 260/465 F; 528/166; 528/210
[58] Field of Search ................ 260/465 F; 528/210, 528/9, 166

[56] References Cited

U.S. PATENT DOCUMENTS 3,869,499  3/1975  Heath et al. .................... 260/465 F
4,223,123  9/1980  Keller et al. .................... 528/210

Primary Examiner—Dolph H. Torrence
Attorney, Agent, or Firm—R. S. Sciascia; A. L. Branning; T. E. McDonnell

[57] ABSTRACT

The synthesis and subsequent polymerization of highly aromatized phthalonitrile monomers which contain phenoxy linkages having a substantially aromatic spacer moiety between the two terminal phthalonitrile groups is disclosed. The phthalonitriles are synthesized by a nucleophilic displacement of a nitro substituent, which is activated by the ring cyano groups on the aromatic ring, by a phenoxide containing unit. The phthalocyanine polymers have improved toughness, low water absorptivity and higher thermal and oxidative resistance than currently available polymers.

13 Claims, 2 Drawing Figures

POLYPHTHALOCYANINE RESINS

BACKGROUND OF THE INVENTION

The present invention pertains to high-temperature resistant resins and, more particularly, to dicyanophenoxy compounds and the cyano-addition resins prepared therefrom.

It is known that certain bisorthodinitriles polymerize to form strong, high-temperature-resistant thermosetting resins. Such suitable bisorthodinitriles are disclosed for example, in U.S. Pat. Nos. 4,056,560, 4,057,569, 4,067,086 and 3,993,631 to James R. Griffith and Jacque O'Rear. U.S. Pat. Ser. Nos. 051,568 (now U.S. Pat. No. 4,226,801), 043,188 (now U.S. Pat. No. 4,223,123), and 075,631 (now U.S. Pat. No. 4,234,712) are further examples of polyphthalcyanines having improved properties.

Several resins, particularly epoxies and polyimides, are finding increasing use in industry. These resins are becoming increasingly used as substitutes for metals when reinforced by various fibers and molded into structural materials. These composites have superior mechanical properties as well as being lighter and more economical. One particular advantage of such materials is the amount of fuel saved by moving structures manufactured from these lightweight materials.

These resins have several disadvantages, however. Conventional epoxy-based composites are limited to a maximum service temperature of 120° C.; other problems associated with these composites include their brittleness, water absorptivity, and engineering reliability. While aromatic polyimides have a greater thermal stability than epoxy resins, their use has not been as extensive as epoxy resins because of their insolubility in organic solvents needed in synthesis, their poor reproducibility on account of the release of water which often splits polymeric chains, trapped solvents in the final resin, and excessive stiffness.

Recently, a new class of resins has been obtained by polymerizing certain phthalonitrile-terminated diamides, often referred to as amide-bridged bisorthodinitriles. These resins have a comparable structural strength to those currently available, in addition to possessing several beneficial properties which are not found in epoxies and polyimides.

Their maximum service temperature stability in an oxygen-containing atmosphere is well over 100° C. greater than that for epoxies. Water absorptivity as measured by the water-soak method is also much lower than that for epoxies. Several of these resins, depending on the bridging chain, have a much greater elastic modulus than epoxy and polyimide resins. These resins have many other advantages over polyimides, due to an absence of solvents in their preparation, lower water absorptivity, as well as not being thermoplastic with a low glass-transition temperature.

Many applications require a structural composite to have an elastic modulus high enough to withstand numerous mechanical stresses and strains over a long period of time. One application is the underbody of jet aircraft exposed to the back blast of jet engines, especially the V/STOL (vertical/short take-off and landing) aircraft. Structural components of helicoptor and automobile frames are also exposed to severe mechanical demands.

SUMMARY OF THE INVENTION

It is, therefore, an object of the present invention to provide a polyphthalocyanine resin which has an elastic modulus high enough to permit the use of the resin in the fabrication for structural components of aircrafts, helicopters, and automobiles which are exposed to severe and/or constant mechanical stresses and strains.

Another object of the present invention is to provide a new type of bisorthodinitriles, having at least two phenyl rings and/or fused aromatic rings in the bridge connecting the thermal phthalonitrile units, which are polymerizable to polyphthalocyanine resins.

Still another object of the invention is to provide a resin which is thermally stable in an oxidative atmosphere at temperatures approaching 300° C.

These and other objects of the invention are achieved by heating a bisphenol with 4-nitrophthalonitrile and a suitable base in a dipolar aprotic solvent to produce a highly aromatized phthalonitrile monomer having a phenoxy linkage with a substantially aromatic spacer between the two terminal phthalonitrile moieties. The resulting phthalonitrile is polymerized by heating, to at least the melting point thereof, either alone or with an approximately stoichiometric amount of a metal or a salt.

Other objects, advantages, and novel features of the invention will become apparent from the following detailed description of the invention when considered in conjunction with the accompanying drawing wherein:

FIG. 1 compares the relative thermal stabilities in air of a biphenyl diether-linked polymer contrasted with other polyphthalocyanine polymers.

FIG. 2 compares the catastrophic breakdown temperature for the same polymers when heated from ambient temperature to 700° C. in a Nitrogen atmosphere at a rate of 10° C./min.

DETAILED DESCRIPTION OF THE INVENTION

Figure 2:
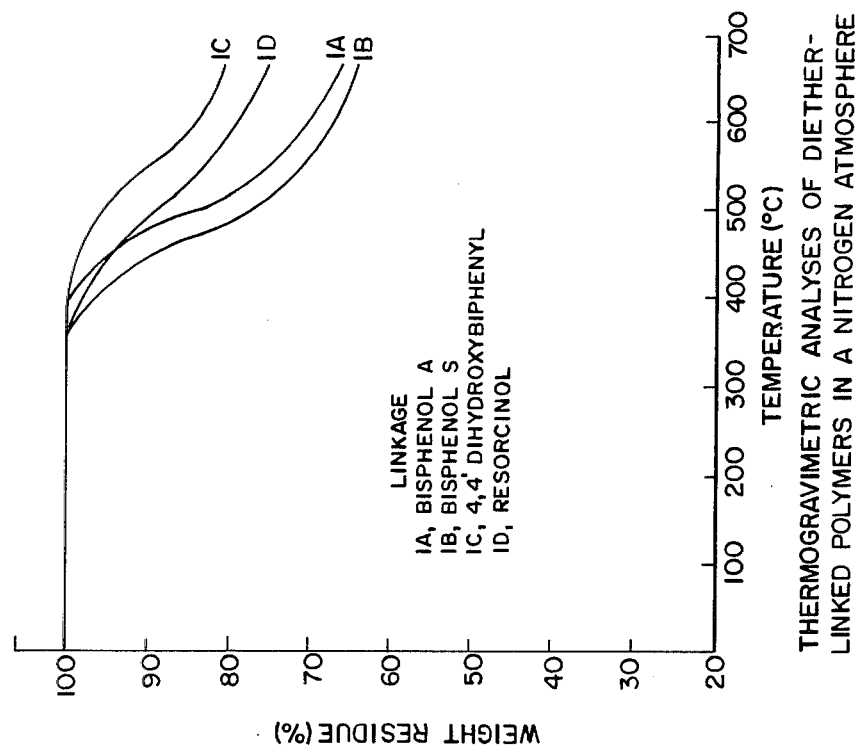

The bisorthodinitriles which can be polymerized to form the polyphthalocyanine resins of the present invention can be described by the generic formula:

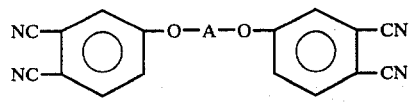

In the broadest embodiment of the invention, A can be any multiple aromatic or fused ring aromatized moiety. The resulting polymerization of these bisorthodinitriles is believed to result in polyphthalocyanine formation, as evidenced by the characteristic dark green hue representative of phthalocyanines and polyphthalocyanines which occurs during the resin formation. Other cyano-addition reactions may also take place; with the resulting resin forming a three-dimensional network polymer having exceptional homogeneity.

The resin with phthalocyanine nuclei has a structural formula:

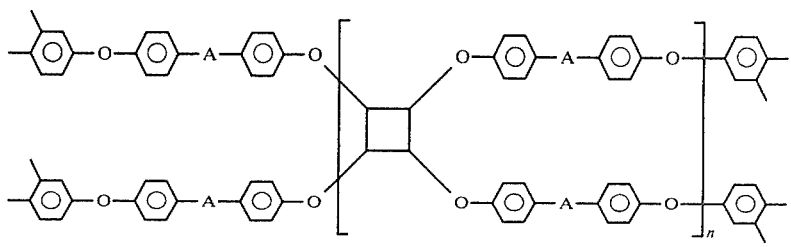

where n is any positive integer, A is an aromatic moiety, and

represents a phthalocyanine nucleus which has the formula:

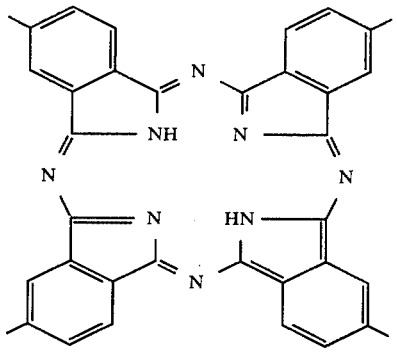

If the phthalocyanine has been coordinated by a metal or salt, the phthalocyanine nucleus is presented as

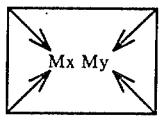

and the formula is:

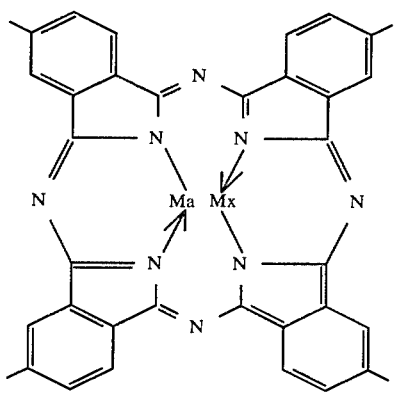

wherein M is a metal and MX is a metallic salt.

The preferred metals for coordinating the resin are copper, iron, zinc, and nickel due to their availability, handling, and desired reactivity, as well as the enhanced thermal stability of the resulting resin. Examples of other metals which may be used are chromium, molybdenum, vanadium, beryllium, silver, mercury, tin, lead, antimony, calcium, barium, manganese, cobalt, palladium, and platinum.

The preferred metallic salt for coordination is stannous chloride. This salt maximizes the reaction rate and is seldom troubled with poor dispersion and voids caused by entrapped gas. These advantages occur, however, only if the stannous chloride is dispersed by the method described hereinafter. Other suitable metallic salts include cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic sulfate, cobaltous cyanide, nickel chloride, nickel cyanide, nickel sulfate, nickel carbonate, stannic chloride, stannous chloride hydrate, a complex of triphenylphosphine oxide and mixtures thereof. Additional examples of metals and salts are found in Mosher, Frank H. and Thomas, Arthur L. *Phthalocyanine Compounds*, N.Y. Reinhold, 1963, p. 104–141.

The reaction which produces phthalonitrile monomers having the formula:

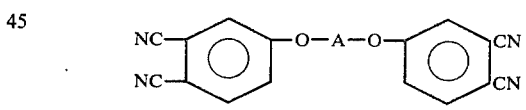

wherein A is as described earlier, occurs as the result of a nucleophilic aromatic displacement of a nitro subsitutent from 4-nitrophthalonitrile by the metallic salt of a bisphenol. The reaction comprises mixing a desired bisphenol with 4-nitrophthalonitrile and a suitable base in a dipolar aprotic solvent as shown by the following schematic:

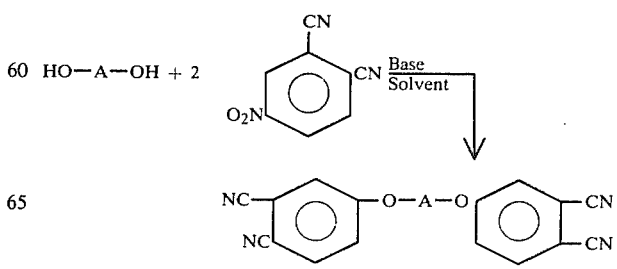

wherein A represents a highly aromatized moiety containing at least one aromatic ring. In another embodiment of the invention, A represents any fused ring system, preferably a fused ring system devoid of aliphatic moieties, i.e., a fused ring structure containing only aromatic moieties. In the narrowest embodiment of the invention, A is selected from the group of biphenyl, naphthalene, and anthracene.

The reaction producing the phthalonitriles is carried out preferably at about 25° to 80° C. in an anhydrous reaction medium comprising a base and a solvent, under an inert atmosphere. The base must have a dissociation constant greater than water, must not form any neutralizing acids, and must not compete with the phenoxide in the nitro displacement. Examples of suitable bases are potassium sodium, or calcium carbonate, sodium, potassium, lithium, or calcium hydroxide, organolithium reagents such as methyl or n-butyl lithium, Grignard agents, and potassium or sodium bicarbonate. The solvent must be dipolar and aprotic, such as dimethyl sulfoxide (DMSO), dimethylformamide (DMF), N-methyl pyrrolidone (NMP) or N, N-dimethyl acetamide.

The bisphenol and 4-nitrophthalonitrile are preferably mixed in an approximate stoichiometric amount, i.e., a bisphenol-nitro mole ratio of 1:2. The solvent is added in an amount at least sufficient to dissolve the reactants and product. A slight stoichiometric excess of base has been found to increase the reaction rate and resultant yield, particularly when the base is either a carbonate or bicarbonate. Using these bases, an amount from 10 to 25 mole percent in excess of the stoichiometric amount is added. It should be noted that excess base can become trapped in the product, so, extra care in the workup and purification of product should be used whenever an excess of base is used.

If the base is a hydroxide, water is formed by the reaction of the base with the protic proton of the bisphenol. Since the cyano groups react with hydroxide in the presence of water, it is necessary to remove all water from the reaction mixture before adding the nitrophthalonitrile reactant. For this reason, the method utilizing a hydroxide base requires the inital steps of mixing the solvent, base, bisphenol and a refluxing liquid, e.g., benzene or toluene until all water (as determined by the stoichiometric equation) has been removed by azeotropic distillation, then cooling the solution to about room temperature before adding the nitrophthalonitrile. After the nitrophthalonitrile has been added, the reaction solution is slowly heated to a temperature from about 25° to about 100° C. and preferably from 25° C. to 80° C., while heating is maintained until the reaction is complete as determined by monitoring the disappearance of the $NO_2$ absorption at 1539 and 1358 cm$^{-1}$ in the IR spectrum. Next, the reaction solution is cooled to about room temperature and poured into cold water (about 10° C. or less). This product is collected by suction filtration, washed with water, and dried in an oven at reduced pressure.

If the base is carbonate or bicarbonate, the reactants, base, and solvent are added in one step and the method proceeds as before except that the reaction solution is slowly poured into cold dilute hydrochloric acid (2 N or less and 15° C. or less). This yield can be increased if the carbonate or bicarbonate is added in increments with no increment being larger than one-third of the total base. When the base is added in one portion, the reaction may not proceed to completion, which is probably attributed to the surface of the base becoming coated during the course of the reaction.

The present bisorthodinitriles can polymerize to the polyphthalocyanines of the subject invention at their melting point, but the reaction is extremely slow. Consequently, it is preferred that the bisorthodinitriles are heated to at least 15° C. above their melting points in order to have the polymerization completed within a reasonable time. The atmosphere can be oxygen-containing, inert, or a vacuum. The heating is continued until the melt solidifies to an extremely hard material. The preferred method of preparation comprises heating a phthalonitrile to a temperature from about 15° to 20° C. above the melting point thereof until the viscosity of the melt begins to increase due to the onset of phthalocyanine formation, which is called the B-stage. At the B-stage, the material can be cooled to a frangible solid and can be stored indefinitely without further reaction. The C-stage is obtained from the B-stage resin by melting the resin and heating the resin at a temperature from about 25° C. above the melting point thereof to about the decomposition temperature of the resulting resin. The B-stage resin can also be broken up, processed into a desired form, and then heated in the above manner. The preferred temperature range for obtaining the C-stage resin is from about 25° C. above the melting point to about the decomposition temperature. The optimum cure for any particular resin at a particular temperature is determined empirically by testing the structural strength of samples over a range of cure times.

In adding a metal or salt to coordinate the phthalocyanine nuclei, the metal or salt is added in a stoichiometric amount while the bisorthodinitrile is molten or powdered. If the amount of the metal or salt is less than stoichiometric, i.e., less than one equivalent per two equivalents of the phthalonitrile monomer, the resulting resin is not completely coordinated with a salt or metal. An amount in excess of stoichiometry would cause the resin to have unreacted metal or salt in it. Avoiding the presence of any unreacted salt or metal is particularly important with the synthesis of the present resins on account of the high temperature needed for polymerization.

High temperatures further require a high degree of purity on account of the increased reactivity of all species present, including the impurities. For example, metal oxides at temperatures above 280° C. can attack the benzene ring structure. The preferred amounts of impurities are less than 100 ppm. Impurities can be present, however, in amounts up to 300 ppm without noticeably affecting the quality of the final resin.

As with all polyphthalocyanine resins, the dispersion of the salt or metal is affected by the particle size. Since the resin is formed at such high temperatures, dispersion becomes particularly critical. Consequently, particle sizes no greater than 100 micrometers are preferred.

If stannous chloride is used to coordinate the resin, the stannous chloride must be introduced into the melt as stannous chloride dihydrate by the following method. The stannous chloride dihydrate ($SnCl_2.2H_2O$) is introduced either as a melt or powder. If the bisorthodinitrile is a powder, the mixture is heated, while being stirred, to a temperature from the melting point to about 20° C. in excess thereof until all water is expelled from the mixture; and if the phthalonitrile is molten, then the mixture is kept at the melt temperature until all water is expelled. The mixture is then reacted either to the B-stage or C-stage in the manner previously described.

The effect of including a metal or salt is the enhancement of the polymerization reaction. Inclusion of a salt or metal permits a large reduction in the polymerization temperatures without greatly affecting the reaction rate, and also causes the reaction to significantly speed up at any given temperature. This promotion effect is especially present with the inclusion of stannous chloride. Using this salt, the polymerization can occur at the melting point of the bisorthodinitrile with an extremely fast polymerization rate.

Examples of the preparation of the bisorthodinitriles and polyphthalocyanines of the invention are herein given. These examples are given by way of explanation and are not meant to limit the disclosure or the claims to follow in any manner.

EXAMPLE I

Synthesis of p,p'-Bis(3,4-Dicyanophenoxy)Biphenyl

A mixture of 5.0 g (0.027 mol) of p,p'-dihydroxybiphenyl, 2.3 g (0.06 mol) of 50% aqueous sodium hydroxide, 60 ml of dimethyl sulfoxide and 25 ml of benzene was heated at reflux under a nitrogen atmosphere for 4 hours and the water was azeotroped from the mixture with a Dean-Stark trap. After cooling to room temperature, 9.7 g (0.056 mol) of 4-nitrophthalonitrile was added in one sum. The disodium salt immediately dissolved and the solution turned green with the rapid formation of the product which precipitated-out. The temperature initially increased to 45° C. but dropped back to room temperature after approximately 1 hour. The reaction mixture was stirred overnight at room temperature. The product mixture was then poured into 200 ml of water. The slightly colored product which separated was collected by suction filtration, washed with water, and dried at reduced pressure to yield 11.2 g (95%) of the desired product, m. p. 228°–230° C.

EXAMPLE II

Synthesis of 2,7-Bis(3,4-Dicyanophenoxy)Naphthalene

A mixture of 4.0 g (0.025 mol) of 2,7-dihydroxynaphthalene (2.2 g, 0.054 mol) of 50% aqueous sodium hydroxide, 30 ml of dimethyl sulfoxide and 25 ml of benzene was heated at reflux under a nitrogen atmosphere for 4 hours. The water was azeotroped from the mixture with a Dean-Stark trap. The reaction content was cooled to room temperature and 8.7 g (0.05 mol) of 4-nitrophthalonitrile was added in one sum. The resulting mixture was stirred for 15 hours at room temperature and was then poured into 150 ml of water. The light-brown precipitate was collected by suction filtration, washed with water, dried at reduced pressure, and washed with hot absolute ethanol to yield 6.1 g (59%) of the desired product, m.p. 201°–204° C.

EXAMPLE III

Polymerization of p,p'-Bis(3,4-Dicyanophenoxy)Biphenyl

The monomer (0.75 g, 1.7 mmol) was placed in a test tube, melted and heated at 280° C. for 96 hours. Gelation was extremely slow (48 hours) at this temperature. The polymeric material was heated two additional days to enhance the toughness.

EXAMPLE IV

Polymerization of p,p'Bis(3,4-Dicyanophenoxy)Biphenyl in the presence of Stannous Chloride Dihydrate The monomer (0.082 g, 1.9 mmol) and stannous chloride dihydrate (0.20 g, 0.9 mmol) were mixed and placed in a small test tube. The contents were heated to the melting point (230° C.) and held at this temperature until the salt dissolved. The dissolution of the salt occured almost immediately and gelation took placed in approximately 10 minutes. The polymeric material was postcured for 24 hours at 280° C.

EXAMPLE V

Polymerization of 2,7-Bis(3,4-Dicyanophenoxy)Naphthalene

The monomer (0.71 g, 1.7 mmol) was placed in a small test tube and heated at 280° C. for 5 days. Gelation had occurred after 3 days. The polymeric material was heated 2 additional days to ensure complete polymerization and to enhance the toughness.

EXAMPLE VI

Polymerization of 2,7-Bis(3,4-Dicyanophenoxy)Naphthalene in the Presence of Stannous Chloride Dihydrate The monomer (0.71 g, 1.7 mmol) and stannous chloride dihydrate (0.18 g, 0.8 mmol) were mixed and placed in a small test tube. The content was heated to 210° C. where the monomer had melted. At this temperature (210° C.), the salt dissolved quickly and the content started increasing rapidly in viscosity. After 10 minutes, solidification had occurred and the polymeric material was postcured at 230° C. for 24 hours.

Figure 1:
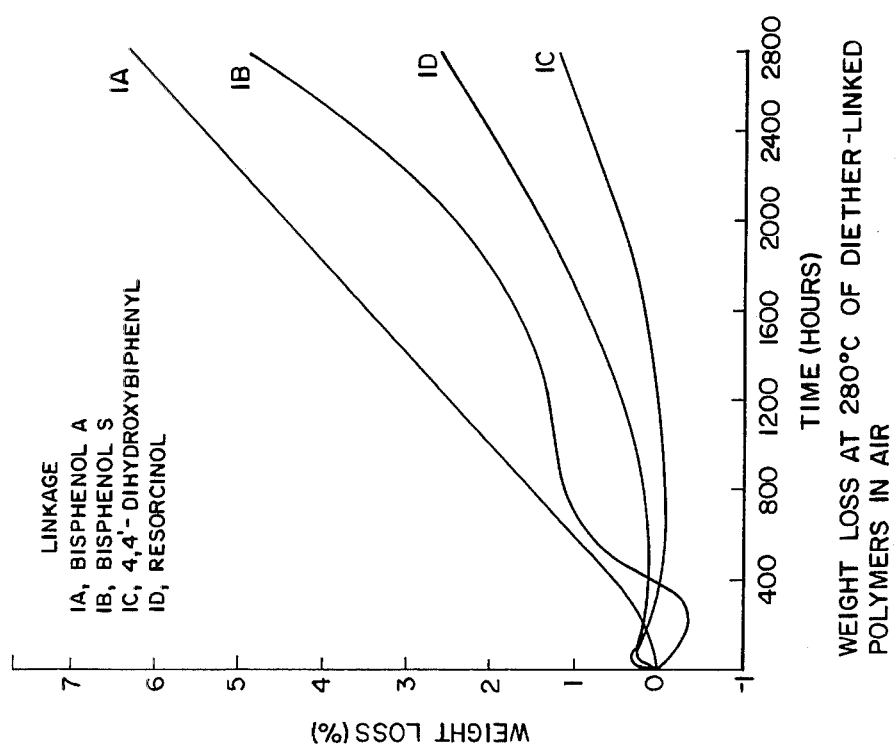

The polyphthalocyanines of this invention suprisingly have a superior thermal stability as well as an extremely high catastropic breakdown temperature. As shown in FIG. 1, the phthalocyanine polymer with the p,p'dihydroxybiphenyl bridge

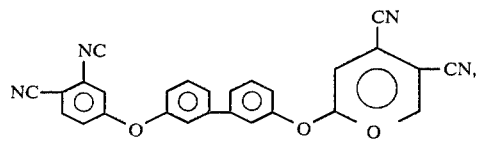

when heated at 280° C. for 3200 hours, exhibits a mere 1.6 weight loss, a result clearly superior to the polyphthalocyanines having either resorcinol, bisphenol S, or disphenol A as a linking unit.

The catastropic breakdown temperature was also determined for the same four polymers, using a thermogravimetric analysis of the polymers heated from ambient temperature to 700° C. in a nitrogen atmosphere at a rate of 10° C./min. All four polymers were stable up to 300° C. before a weight loss could be detected. Viewing FIG. 2, it is seen that the most stable polymer is that having p,p'-dihydroxybiphenyl as a linking agent, while bisphenol S is clearly the least stable resin. At about 470° C., resorcinol and bisphenol A reverse their order of stability, with bisphenol A exhibiting a greater weight loss at higher temperature.

Additionally, the highly aromatized polymers demonstrate superior toughness, are less brittle, and have a minimal attraction for water so long as no polar units are included are included in their structure.

Oviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A polymer resin prepared from a dicyanophenoxy compound having the formula:

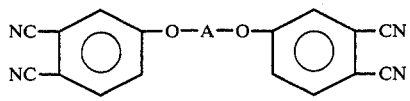

wherein A is selected from the group consisting of polyphenyl radicals having only phenyl groups and fused aromatic poly-ring radicals by heating said dicyanophenoxy compound to at least the melting point thereof.

2. The resin of claim 1 wherein A is a polyphenyl radical having only phenyl groups.

3. The resin of claim 2 wherein A is biphenyl.

4. The resin of claim 1 wherein A is a fused aromatic poly-ring radical.

5. The resin of claim 4 wherein A is selected from the class consisting of naphthalene and anthracene.

6. A polymer resin prepared from a dicyanophenoxy compound having the the formula:

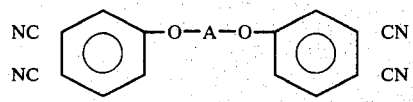

wherein A is selected from the group consisting of polyphenyl radicals having only phenyl groups and fused aromatic poly-ring radicals by mixing and heating said dicyanophenoxy compound to at least the melting point thereof with a metal selected from the group consisting of copper, iron, zinc, nickel, chromium, molybdenum, vanadium, beryllium, silver, mercury, tin, lead, antimony, cobalt, palladium, and platinum or a salt selected from the group consisting of cuprous bromide, cuprous cyanide, cuprous ferricyanide, zinc chloride, zinc bromide, zinc iodide, zinc cyanide, zinc ferrocyanide, zinc acetate, zinc sulfide, silver chloride, ferrous chloride, ferric chloride, ferrous ferricyanide, ferrous chloroplatinate, ferrous fluoride, ferrous sulfate, cobaltous chloride, cobaltic chloride, cobaltic sulfate, cobaltous cyanide, nickel chloride, nickel cyanine, nickel sulfate, nickel carbonate, stannic chloride, stannous chloride hydrate, a complex of triphenylphosphine oxide and mixtures therefore.

7. The resin of claim 6 wherein said dicyanophenoxy compound is mixed and heated with a salt or metal in about a stoichiometric amount.

8. The resin of claim 7 where A is polyphenyl radical having only phenyl groups.

9. The resin of claim 8 wheein A is biphenyl.

10. The resin of claim 7 wherein A is a fused aromatic poly-ring radical.

11. The resin of claim 10 wherein A is selected from the class consisting of naphthalene and anthracene.

12. The resin of claims 9 or 11 wherein said metal is selected from the class consisting of copper, iron, zinc, and nickel.

13. The resin of claims 9 or 11 wherein said salt is stannous chloride dihydrate.

* * * * *